(12) United States Patent
Gantz

(10) Patent No.: US 10,188,955 B2
(45) Date of Patent: Jan. 29, 2019

(54) MOBILE ENTERTAINMENT APPARATUS AND METHOD OF USE

(71) Applicant: Big Red Fun, Inc., Schaumburg, IL (US)

(72) Inventor: Christopher Gantz, Fox River Grove, IL (US)

(73) Assignee: Big Red Fun, Inc., Schaumburg, IL (US)

( * ) Notice: Subject to any disclaimer, the term of this patent is extended or adjusted under 35 U.S.C. 154(b) by 2 days.

(21) Appl. No.: 15/729,688

(22) Filed: Oct. 11, 2017

(65) Prior Publication Data

US 2018/0243659 A1 Aug. 30, 2018

Related U.S. Application Data

(60) Provisional application No. 62/463,678, filed on Feb. 26, 2017.

(51) Int. Cl.
| | |
|---|---|
| *A63G 27/00* | (2006.01) |
| *A63G 31/00* | (2006.01) |
| *A63J 5/02* | (2006.01) |
| *A63J 5/00* | (2006.01) |
| *B62D 63/08* | (2006.01) |

(52) U.S. Cl.
CPC ............ *A63G 31/00* (2013.01); *A63J 5/025* (2013.01); *A63G 2200/00* (2013.01); *B62D 63/08* (2013.01)

(58) Field of Classification Search
CPC .... A63G 2200/00; A63G 27/00; A63G 31/00; A63G 31/16; A63B 2009/006; A63J 1/00; A63J 25/00

USPC ............... 472/3, 59–62, 136; 296/26.01, 162
See application file for complete search history.

(56) References Cited

U.S. PATENT DOCUMENTS

| | | | | |
|---|---|---|---|---|
| 1,569,780 | A * | 1/1926 | Nock ...................... | A63G 3/02 472/3 |
| 3,552,747 | A * | 1/1971 | Deem .................... | A63G 27/00 472/3 |
| 5,947,502 | A * | 9/1999 | Kammerzell ............ | E04H 3/28 108/143 |
| 6,393,769 | B1 * | 5/2002 | Mertik .................. | B60P 3/0252 296/162 |
| 8,678,941 | B2 * | 3/2014 | Bilsen .................. | B60P 3/0252 446/427 |
| 9,192,867 | B1 * | 11/2015 | Sann ...................... | A63B 17/02 |
| 2010/0320708 | A1 * | 12/2010 | Pope ................... | E04B 1/34305 280/30 |

* cited by examiner

*Primary Examiner* — Kien Nguyen
(74) *Attorney, Agent, or Firm* — Kevin Keener; Keener and Associates P.C.

(57) ABSTRACT

A novel mobile entertainment apparatus and method of use is disclosed. The apparatus comprises a mobile platform, an enclosure disposed on a top side of the mobile platform, and an obstructed access simulation device disposed on a top side of the mobile platform. The mobile platform comprises a hitch; one or more axles; one or more wheels disposed on the one or more axles; and one or more jacks disposed on a bottom side of the mobile platform. The enclosure comprises a right side wall; a left side wall; a rear wall; and a front wall. The obstructed access simulation device comprises a frame; one or more hinges attached to the frame; a door attached to the one or more hinges; and an obstruction device.

19 Claims, 14 Drawing Sheets

MOBILE ENTERTAINMENT APPARATUS AND METHOD OF USE

PRIORITY

This application claims priority to U.S. Provisional Patent Application Ser. No. 62/463,678, filed on Feb. 26, 2017, the disclosure of which is hereby fully incorporated by reference.

FIELD OF THE INVENTION

This invention pertains generally to entertainment vehicles and more particularly to an entertainment trailer utilizing a themed enclosure and an obstructed access simulation device.

BACKGROUND OF INVENTION

Mobile entertainment units are well known, particularly in the form of video arcade vehicles. A drivable unit is maneuvered to an entertainment location. Users are then permitted access to the internal space of the vehicle to play video games. In other embodiments, panels on the side of the vehicle open up to display screens and permit users to play games in an external space. What is lacking in these units is the educational and physical interaction between the unit and the user. Therefore, what is needed is a mobile entertainment unit which allows users to engage the unit in a physical and educational manner.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

This invention is a method for entertaining event attendees by producing military-themed, police-themed or firefighting-themed entertainment environments and then transporting the mobile environment to an event location. Events service all ages of attendees in a social, non-technical atmosphere. At the event location, event attendees are provided with temporary authorization and access to the entertainment environment where they participate in scenario-based rescue evolutions and are subsequently entertained. Attendees work together to mimic real-world emergency scenarios in a low-impact, imaginative environment. At the conclusion of the entertainment, temporary authorization and access is revoked and the mobile environment is removed from the event location. The mobile environment preferably is a trailer pulled by a delivery vehicle, such as a pickup truck. The trailer has multiple entry points and contains a plurality of sections including reduced scale rooms to provide simulation for scenario-based environments such as, but not limited to, building collapse, fire, hazardous materials or tactical situations. The preferred trailer features a non-toxic smoke generator; special-effect lighting; audio equipment; and an obstructed-access simulation. Each section provides attendees with hands-on activities related to the presented scenario for the event. The obstructed-access simulator is fabricated to have attendees breach the obstacle to gain entry into other sections of the mobile platform. The obstructed-access simulation is able to be reset for repetitive use and modified for varying levels of force necessary to breach the obstruction with different materials such as, but not limited to, wood, drywall, plastic, cardboard or metal.

The invention is directed toward a mobile entertainment apparatus. The apparatus comprises a mobile platform, an enclosure disposed on a top side of the mobile platform, and an obstructed access simulation device disposed on a top side of the mobile platform. The mobile platform comprises a hitch; one or more axles; one or more wheels disposed on the one or more axles; and one or more jacks disposed on a bottom side of the mobile platform. The enclosure comprises a right side wall; a left side wall; a rear wall; and a front wall. The obstructed access simulation device comprises a frame; one or more hinges attached to the frame; a door attached to the one or more hinges; and an obstruction device.

The mobile entertainment apparatus may further comprise a non-toxic smoke generator disposed within the enclosure; one or more speakers disposed within the enclosure; or one or more lights disposed within the enclosure. The mobile entertainment apparatus may further comprise an open deck portion disposed on a rear portion of the mobile platform, wherein the mobile deck portion further comprises a right side rail and a left side rail. In another embodiment of the invention the enclosure further comprises one or more doors.

The mobile entertainment apparatus may further comprise a ramp disposed on a rear portion of the mobile platform. The mobile entertainment apparatus may further comprise a vertically movable ceiling portion disposed in the enclosure. In another embodiment of the invention the door of the obstruction device further comprises a strike plate disposed on a front side of the door. In another embodiment of the invention the obstruction device comprises a door mounted portion; a frame mounted portion; and one or more elongated members removably secured to the door mounted portion and the frame mounted portion The invention is also directed toward a method for providing entertainment comprising attaching a mobile entertainment apparatus to a towing vehicle; towing the mobile entertainment apparatus to an entertainment location; disconnecting the mobile entertainment apparatus from the towing vehicle; stabilizing the mobile entertainment apparatus my means of the one or more jacks; permitting one or more individuals access to the mobile entertainment apparatus; permitting a user to engage the obstructed access simulation device with a breaching device; and permitting a user to enter the enclosure.

The method may further comprise reattaching the mobile entertainment apparatus to the towing vehicle; and towing the mobile entertainment apparatus to a second location. The method may further comprise extending a ramp from the mobile platform prior to permitting access to the mobile entertainment apparatus; and retracting the ramp after terminating access to the mobile entertainment apparatus. The method may further comprise lowering a vertically movable ceiling portion in the enclosure while a user is within the enclosure.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

Figure 1:
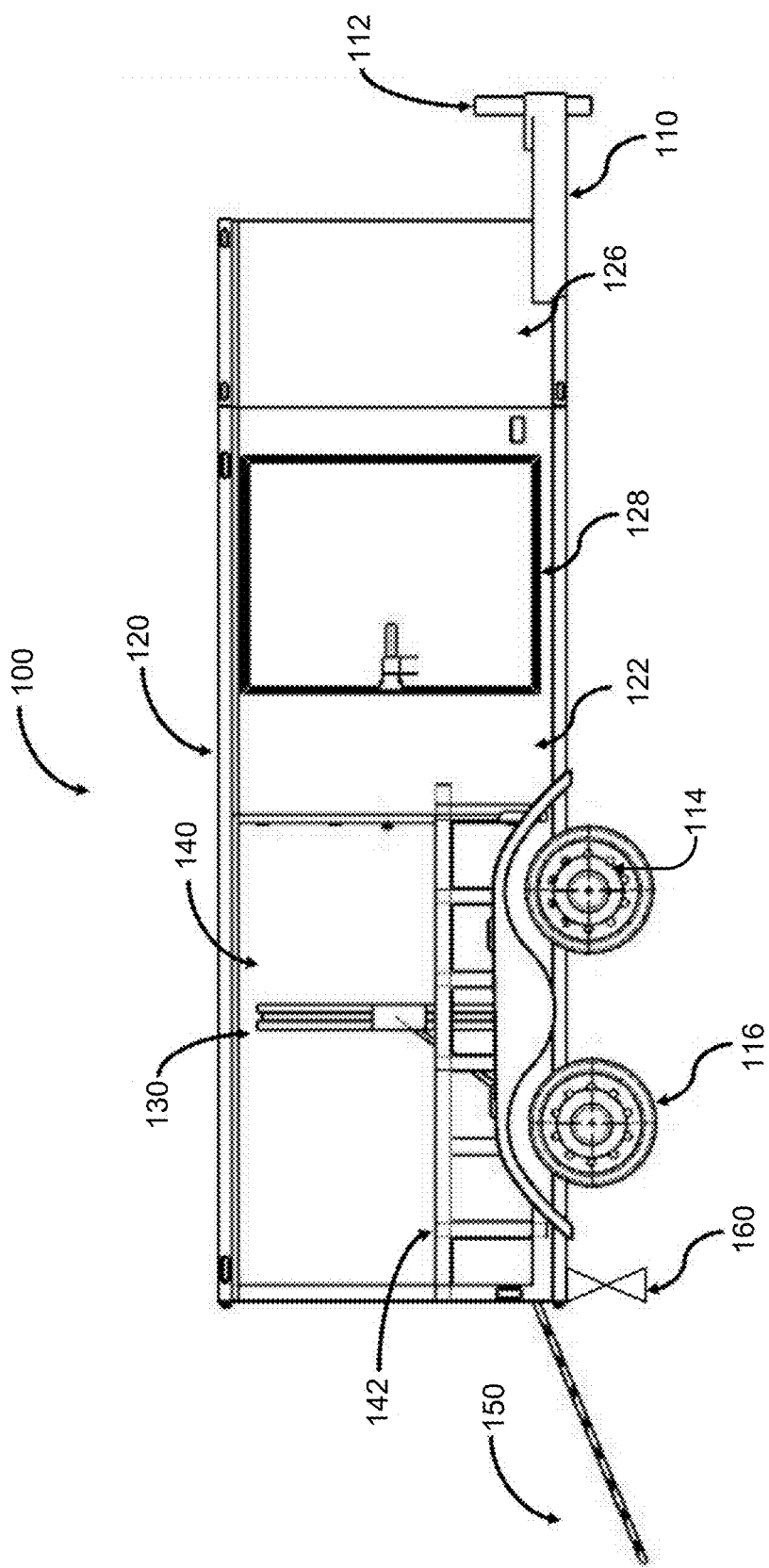
FIG. 1 is a right side view of the entertainment trailer.
Figure 2:
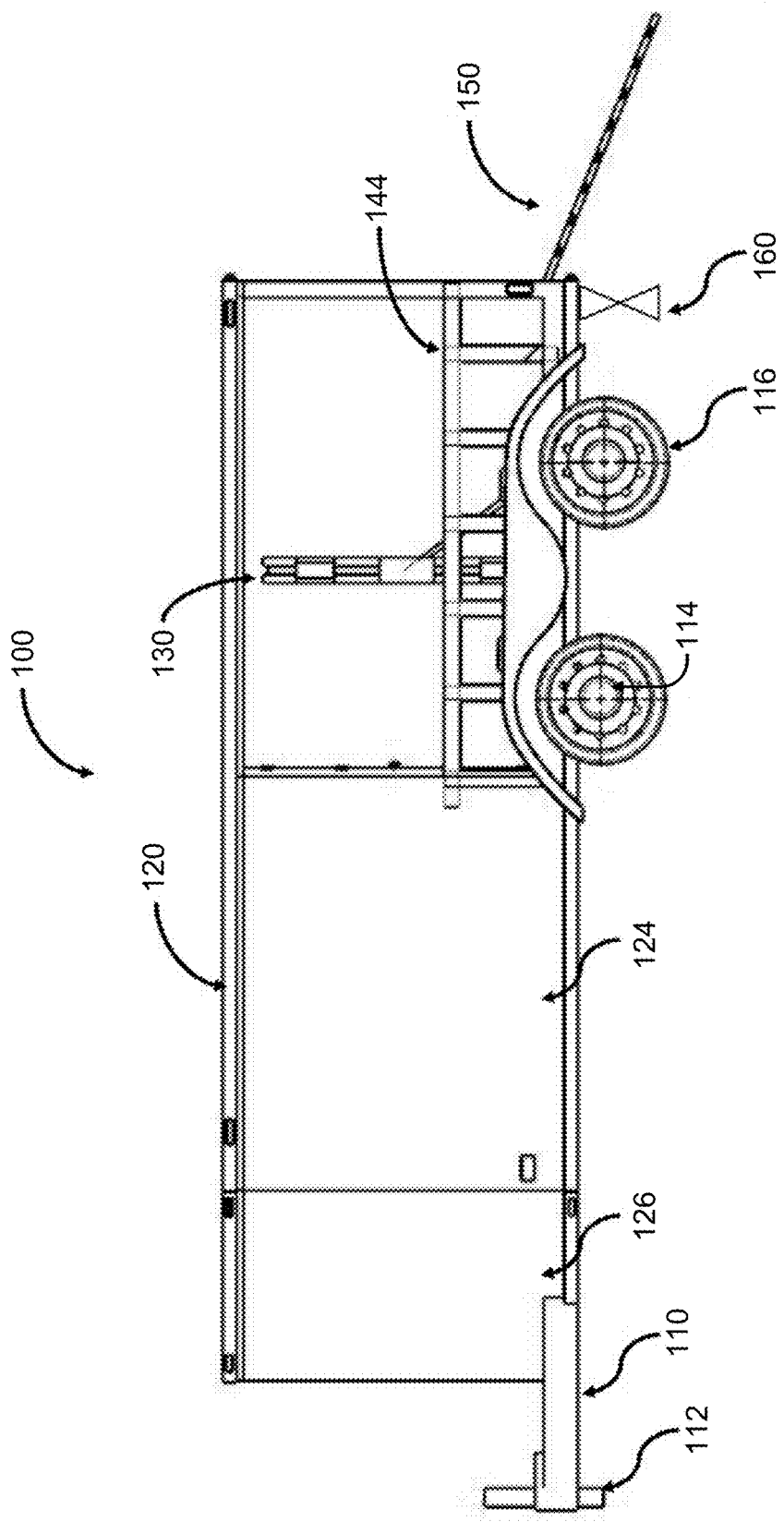
FIG. 2 is a left side view of the entertainment trailer.
Figure 3:
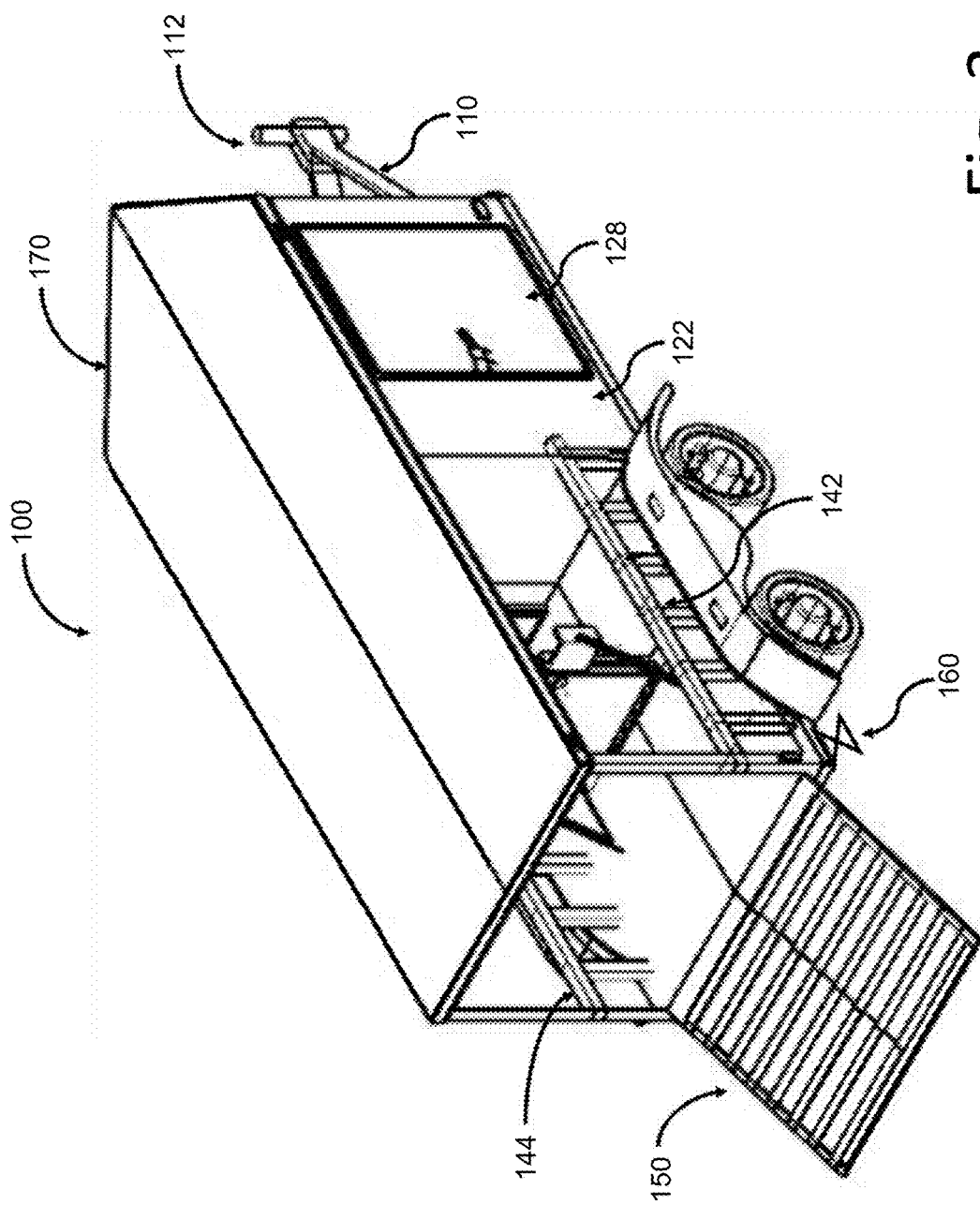
FIG. 3 is a top perspective view of the entertainment trailer.
Figure 4:
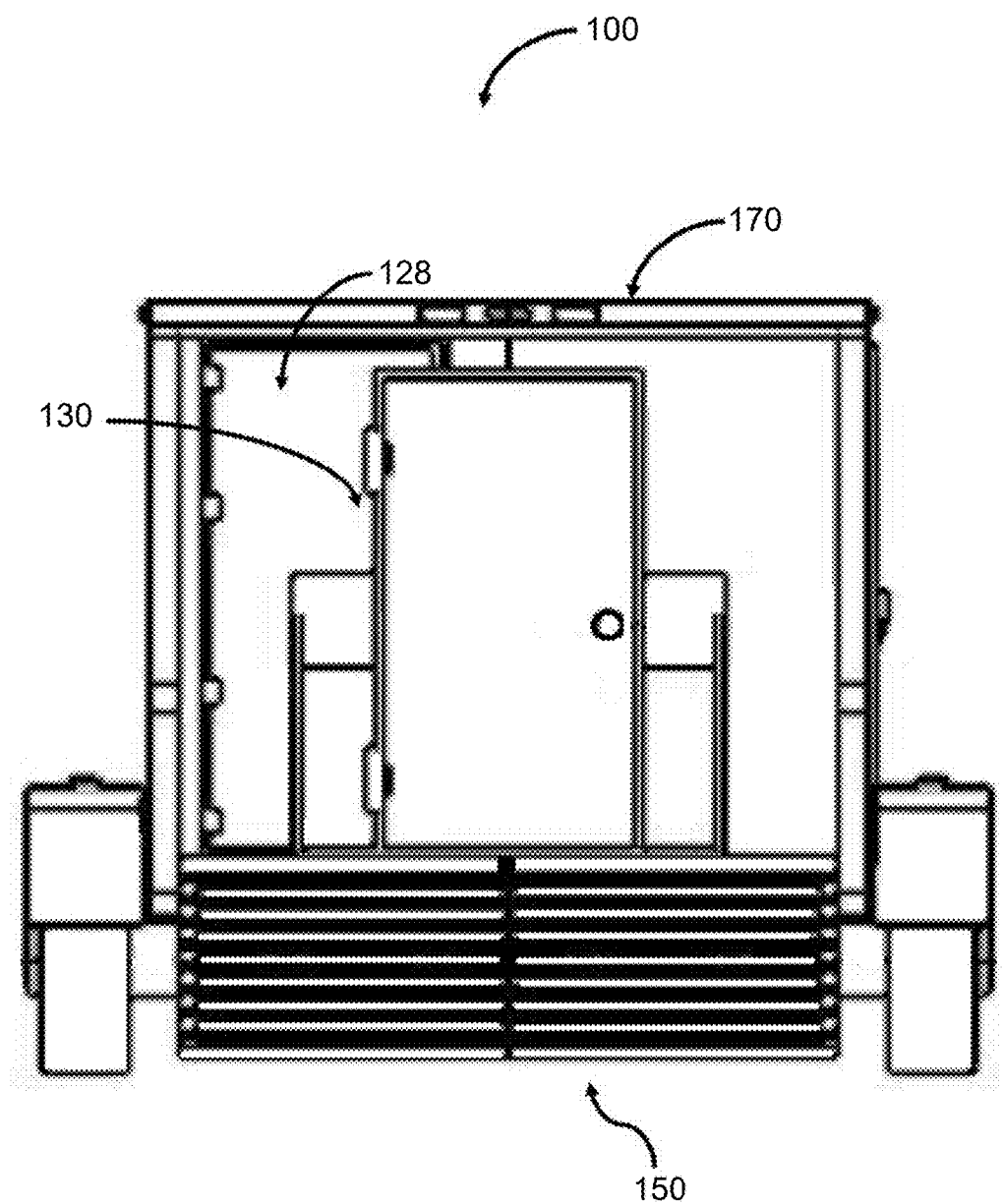
FIG. 4 is a rear view of the entertainment trailer.
Figure 5:
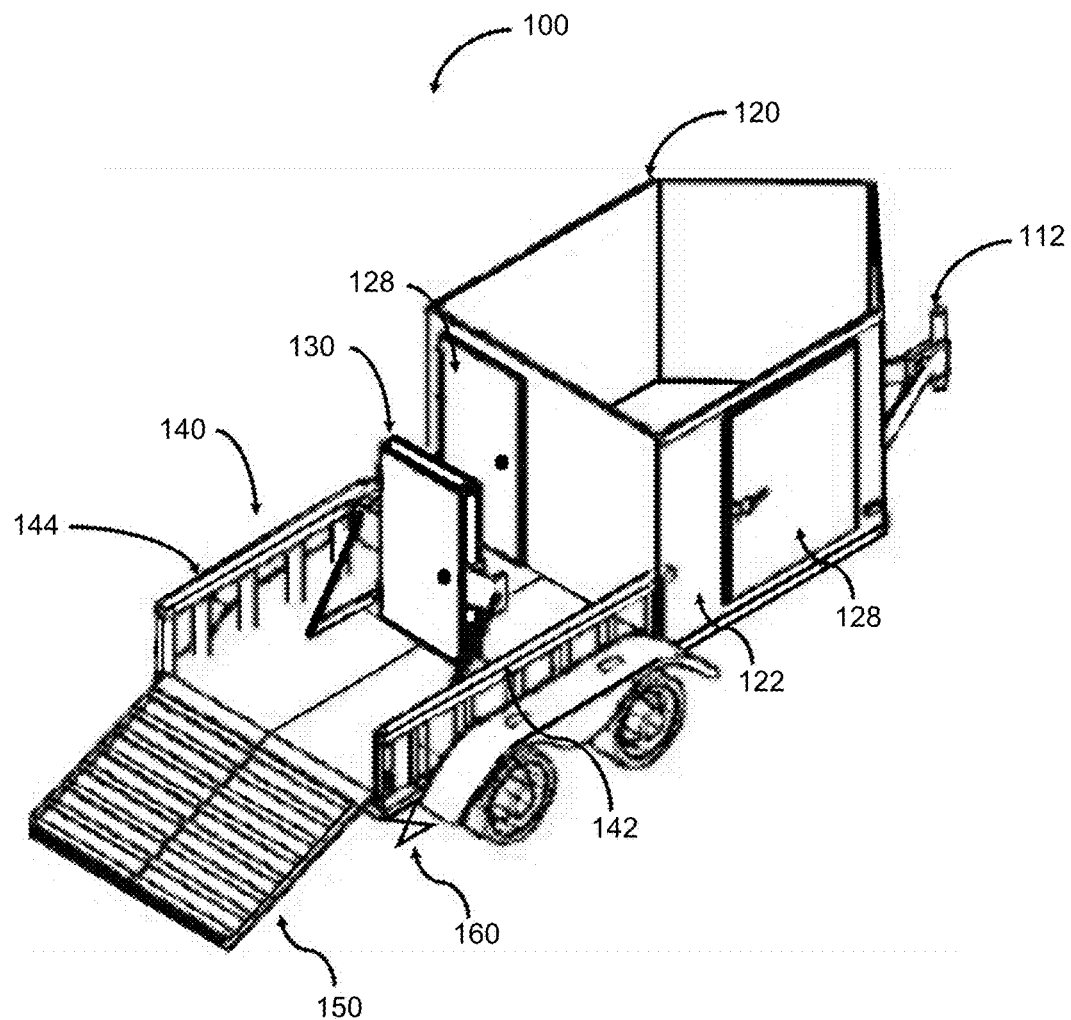
FIG. 5 is a top perspective view of the entertainment trailer with the roof removed.

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

The invention is directed toward a method for entertaining event attendees by providing them with temporary access to a military-themed, police-themed or firefighting-themed entertainment environments. The entertainment environment preferably comprises enclosure that can be transported to any event location by a delivery vehicle. Preferably, the enclosure is a trailer twenty feet long by eight feet wide. A trailer of this size maximizes the amount of usable space while remaining within acceptable size guidelines for safe driving on public streets and without a need for a special permit. The preferable trailer's weight does not require a commercial driver's license. While an enclosure such as a trailer of this size is preferred, any environment is acceptable as long as it is mobile and can accommodate the features as described below. For example, the entertainment apparatus could be an open-air trailer, a flatbed truck, a box truck or any other mobile environment as is known in the art. The enclosure attaches to the delivery vehicle. The enclosure preferably has one or more entry locations to accommodate event attendees and to facilitate the scenario flow of event attendees. The entertainment environment has a drop down ramp on rear of enclosure. The enclosure also includes a door that opens into the enclosed section to the rear of the enclosure. The enclosure also includes a door that opens into the enclosed section to the front of the enclosure. Multiple entry points can be used, however the ramp can accommodate both large groups of attendees and wheelchairs.

The entertainment environment also has jacks positioned at each rear corner of enclosure. The jacks can be lowered and used to prevent excessive movement when event attendees occupy the entertainment environment. In the preferred embodiment, at least two jacks are used, one near each rear corner of the enclosure. The entertainment environment may have an enclosure, an open deck area, side rails, sidewalls, and a front-end wall, which is near where the entertainment environment connects to a delivery vehicle. At the back end of entertainment environment is a ramp.

Referring to the FIG. 1 through FIG. 5, the preferred embodiment of the entertainment trailer 100 is illustrated. The entertainment trailer 100 is based upon a mobile platform 110. The mobile platform 110 is structural base upon which the entertainment environment is mounted. The mobile platform 110 is preferably a structural steel frame forming a solid base, although other materials such as wood may be used. The mobile platform 110 may be any size and shape. At the front end of the mobile platform 110 is a hitch 112. The hitch 112 is any standard style hitch which permits the mobile platform 110 to be attached to a towing vehicle such as a truck or a tractor. The hitch 112 allows for a physical and securing contact point between the mobile platform 110 and the towing vehicle as well as an electrical connection between the mobile platform 110 and the towing vehicle, permitting operating lights on the mobile platform 110, such as brake lights and turn signals, to operate in conjunction with the lights of the towing vehicle. The mobile platform 110 has one or more axles 114 disposed underneath the mobile platform 110. The axles 114 are rotably connected to the mobile platform 110. At the ends of the axles 114 are one or more wheels 116. The wheels 116 may be in any configuration and may be any size. The axles 114 and the wheels 116 permit the mobile platform 110 to be towed to any location by a towing vehicle. In addition, the mobile platform 110 may have brakes attached to the wheels 116 which are electrically connected to the braking system of the towing vehicle to allow for faster braking of the towing vehicle and trailer together.

Disposed on the mobile platform 110 is an enclosure 120. The enclosure 120 may be any size and shape. The enclosure 120 is preferably located on the anterior portion of the mobile platform 110 adjacent to the hitch 112. The enclosure may, however, be located at any position on the mobile platform 110. The enclosure 120 is formed by a plurality of walls, primarily a right wall 122, a left wall 124, a front wall 126, and a rear wall. The enclosure may be any size and shape. Each of the walls forming the enclosure may be any size and shape. The walls may be made from any material. In the preferred embodiment the front wall 126 is split into a "V" shape to maximize the internal space of the enclosure 120. The enclosure may have one or more doors 128. In the preferred embodiment one door 128 is disposed in the right wall 122 and one door is disposed in the rear wall.

In the posterior portion of the mobile platform 110 is the deck area 140. The deck area 140 may be any size and shape. In some embodiments there is no deck area 140 and the enclosure 120 comprises the entire surface of the mobile platform 110. The deck area 140 is an open area in the rear part of the mobile platform. The deck area 140 may have a right rail 142 and a left rail 144 to prevent entrants from falling off of the mobile platform 110. At the rear part of the deck area 140 is a ramp 150. The ramp 150 may be any size and shape. In the preferred embodiment the ramp 150 is rotably connected to the mobile platform 110. In this manner the ramp 150 may be rotated down so that the end touches the ground and permits users to walk up to the deck area 140. When the trailer is not in use the ramp 150 may be rotated upward so that it forms a complete rear wall and barrier to the deck area 140.

Underneath the mobile platform may be one or more jacks 160. The jacks 160 may be any size and shape. The jacks 160 are retractable struts or other support components. The jacks 160 may be extended downward until the jacks 160 come into contact with the ground. The jacks 160 may then be locked into place. In this manner the jacks 160 provide stabilizing support for the entertainment trailer 100 while users are permitted access to the entertainment trailer 100.

At the top of the entertainment trailer is a roof 170. The roof 170 may be any size and shape. In the preferred embodiment the roof 170 covers the entirety of the mobile platform 110. In other embodiments the roof 170 covers only a portion of the mobile platform 110. The roof 170 provides cover from the elements for users so that that entertainment trailer 100 may be utilized in any climate condition.

Disposed in the deck area 140 is the obstructed access simulation device 130. The obstructed access simulation device 130 is a device permitting users to practice using forcible entry equipment such as a battering ram. The obstructed access simulation device 130 may be disposed at any part in the deck area 140. In other embodiments the obstructed access simulation device 130 is disposed within the enclosure 120. The obstructed access simulation device 130 may be disposed in any configuration or position. The obstructed access simulation device 130 may be movable about the deck area 140 or may be secured to the mobile platform 110 and thus in a fixed position.

Referring to FIG. 6A through 6E, the preferred embodiment of the obstructed access simulation device 130 is illustrated. As seen in FIG. 6, the front side of the obstructed access simulation device 130 is illustrated. The obstructed access simulation device 130 comprises a frame 230. The frame 230 may be made from any material, such as wood or steel. The frame 230 may be secured to the mobile platform 110 and/or the roof 170. The frame 230 may have one or more struts 232. The struts 232 are angular beams extending from the frame 230. The struts 232 may be disposed at any angle from the frame 230. The struts 232 may be disposed toward the front of the obstructed access simulation device 130, to the rear of the obstructed access simulation device 130, or to either side of the obstructed access simulation device 130. The struts 232 are utilized to provide additional support to the obstructed access simulation device 130 during use to prevent the obstructed access simulation device 130 from tipping or falling over.

Attached to the frame 230 are one or more hinges 236. The hinges 236 connect an obstructed door 234 to the frame 230. The hinges 236 permit the obstructed door 234 to rotate from an open to a closed position. The obstructed door 234 may swing in either direction on the hinges 236. In the preferred embodiment the obstructed door 234 swings open from the closed position toward the rear of the obstructed access simulation device 130. The obstructed door 234 may be any size and shape and may be made from any material, such as metal or wood. In some embodiments the obstructed door 234 may be removed and replaced based on the desired use.

Disposed on the front side of the obstructed door 234 is a strike plate 240. The strike plate 240 may be any size and shape. The strike plate 240 may be made of any material. In the preferred embodiment the strike plate 240 is a metal plate attached to the obstructed door 234. The strike plate 240 is a plate intended for receiving a blow from a battering ram or other forcible entry equipment. In the preferred embodiment the strike plate 240 may have a striking area 242. The striking area 242 is the preferred location on the strike plate 240 for receiving a blow from a battering ram or other forcible entry equipment. The striking area 242 may be visually distinguished from the remainder of the strike plate 240. The striking area 242 may be visually distinguished with a decal or a painting of a shape, such as a target, bullseye, or a star.

Figure 6A:
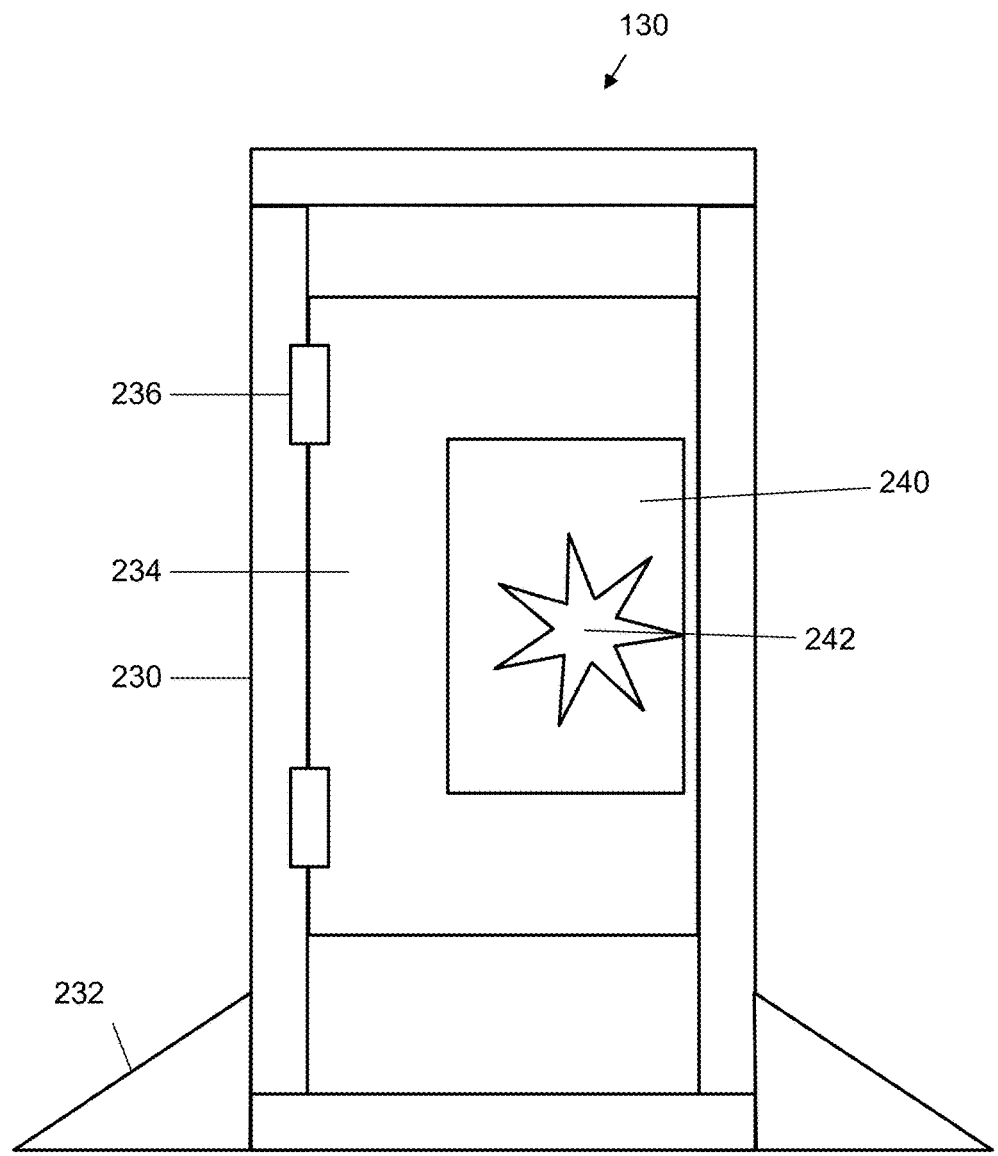
FIG. 6A is a front view of the obstructed access simulation device.
Figure 6B:
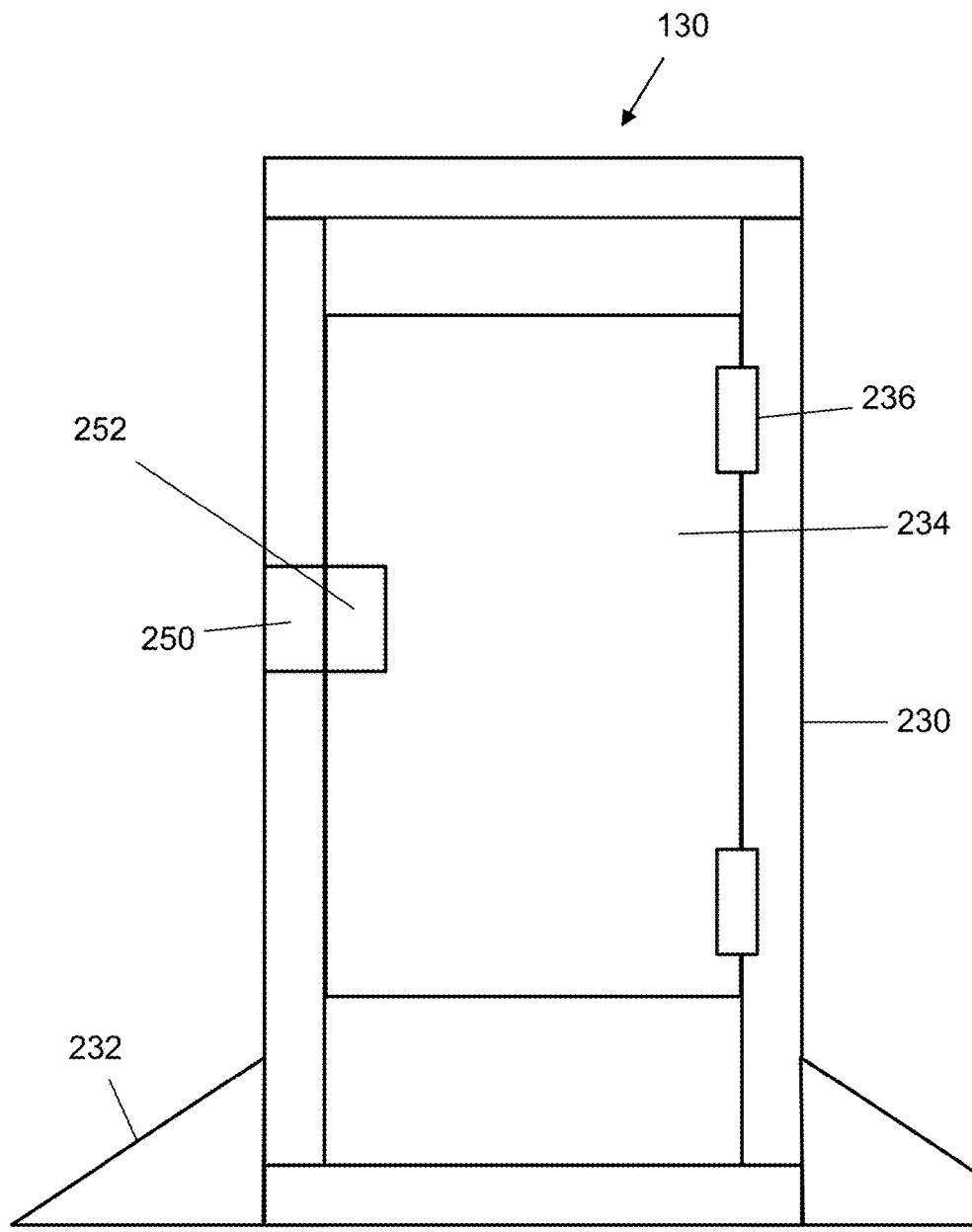
FIG. 6B is a rear view of the obstructed access simulation device.

Referring to FIG. 6B, the rear side of the obstructed access simulation device 130 is illustrated. Disposed on the rear side of the obstructed access simulation device 130 is an obstruction device which prevents the obstructed door 234 from opening. The obstruction device comprises a frame obstruction portion 250 and a door obstruction portion 252.

Figure 6C:
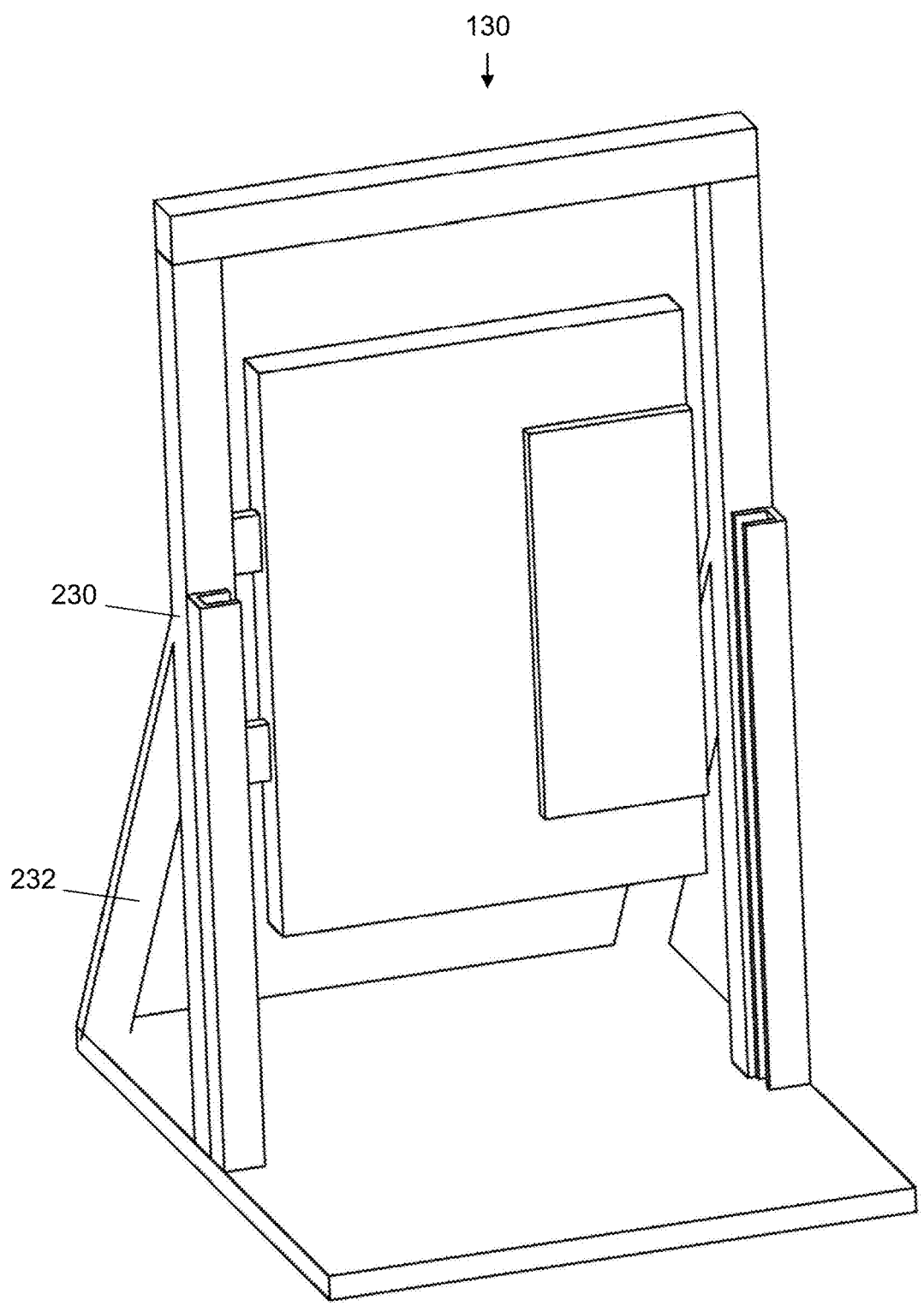
FIG. 6C is a top perspective view of the obstructed access simulation device.
Figure 6D:
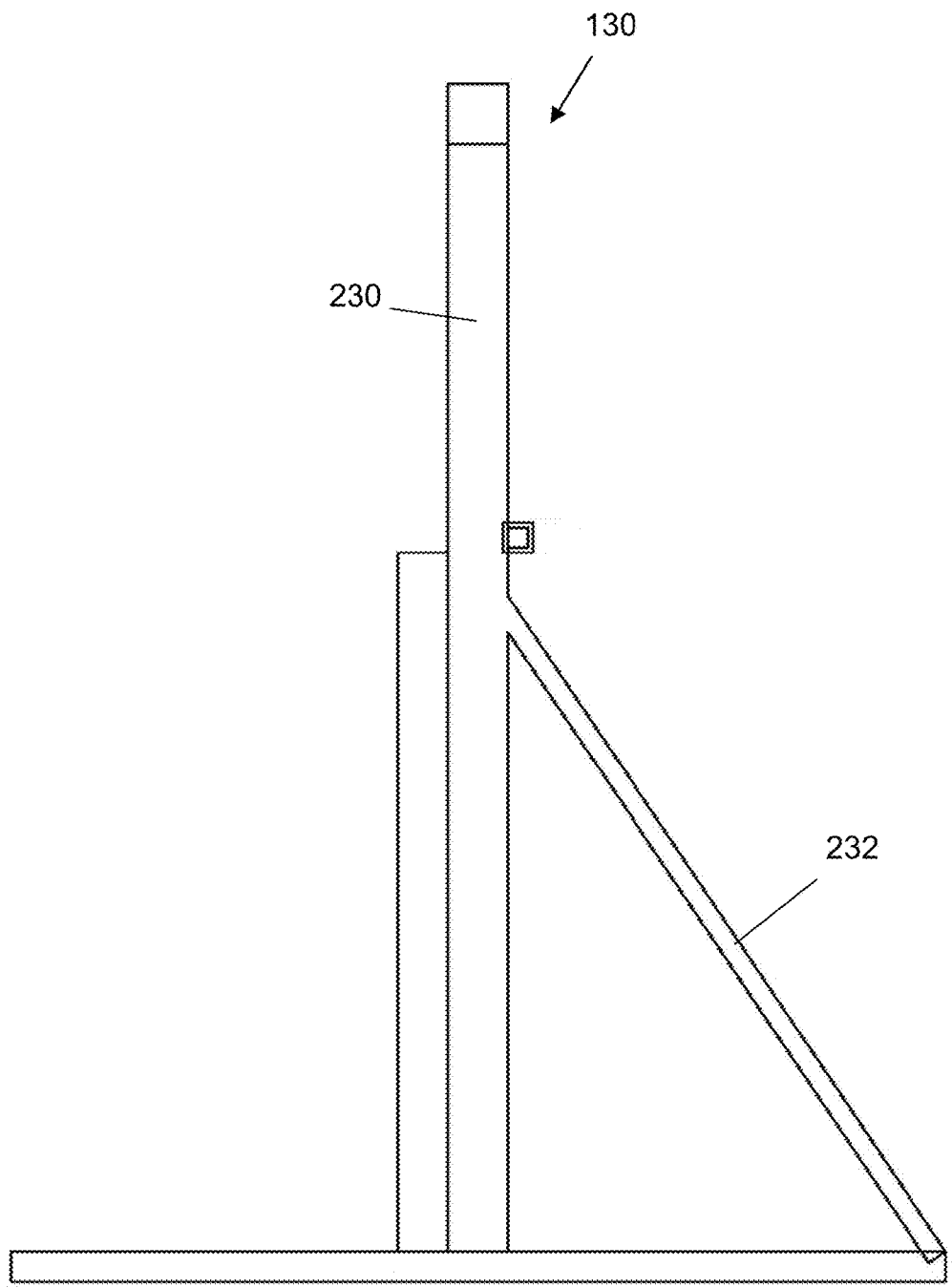
FIG. 6D is a side view of the obstructed access simulation device.
Figure 6E:
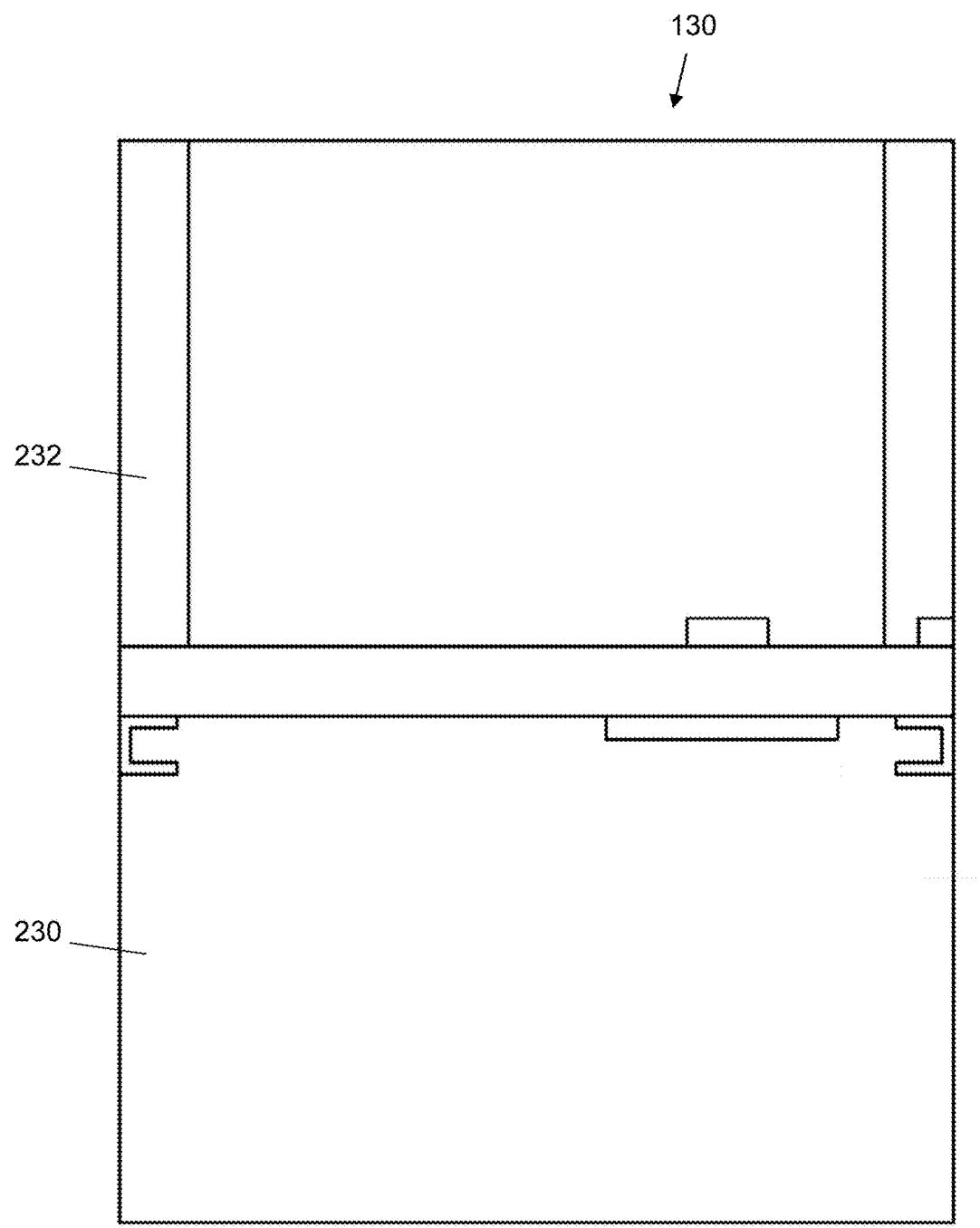
FIG. 6E is a top view of the obstructed access simulation device.

FIG. 6C through FIG. 6E illustrate the preferred embodiment of the obstructed access simulation device. In this embodiment the frame 230 may be reinforced with external portions or bars. In addition the frame 230 may have a flattened plate as a base. In some embodiments the frame 230 may be angled at an incline so the door 234 is angled so that it is not perpendicular to the base of the frame 230.

Figure 7:
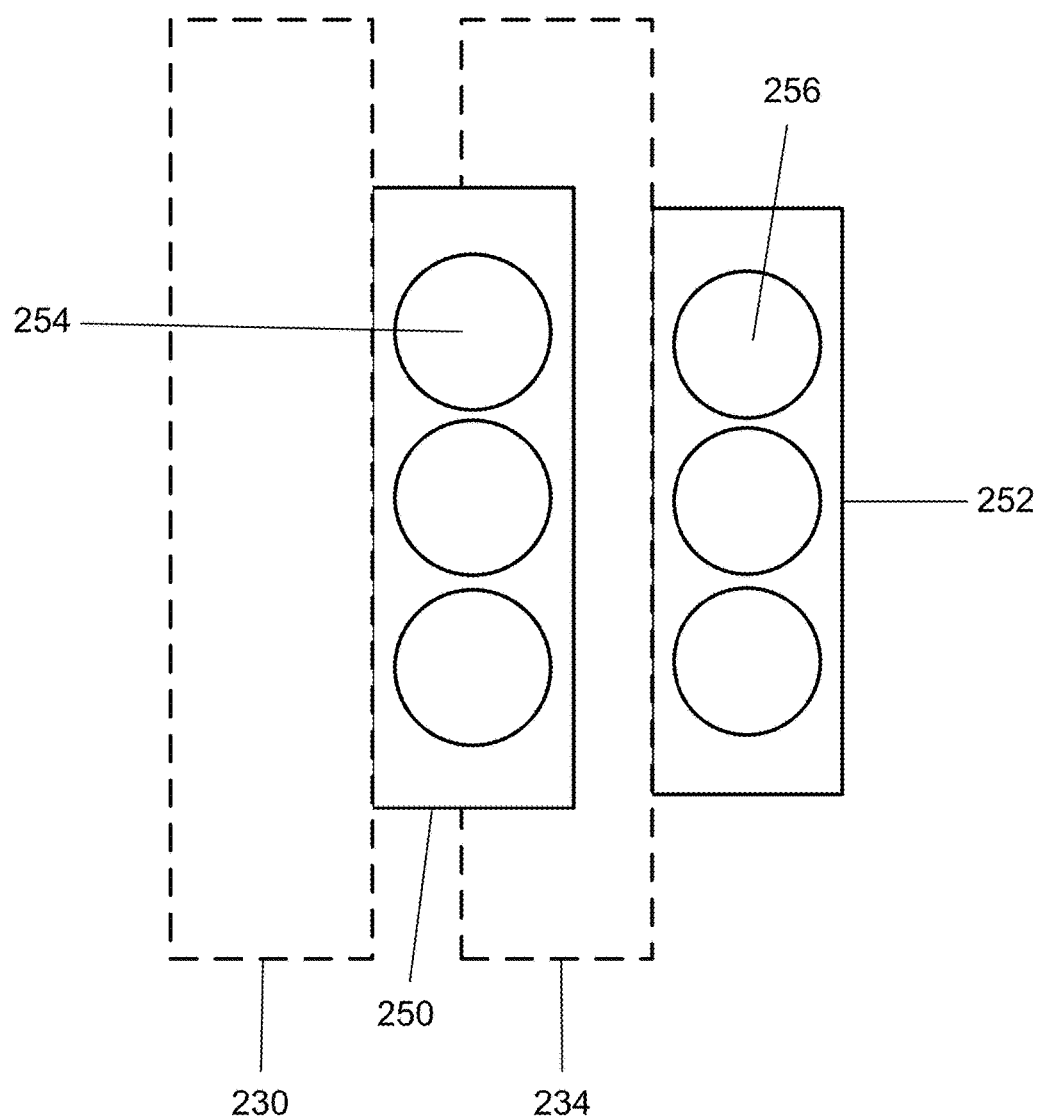
FIG. 7 is a side view of the obstruction device.
Figure 8:
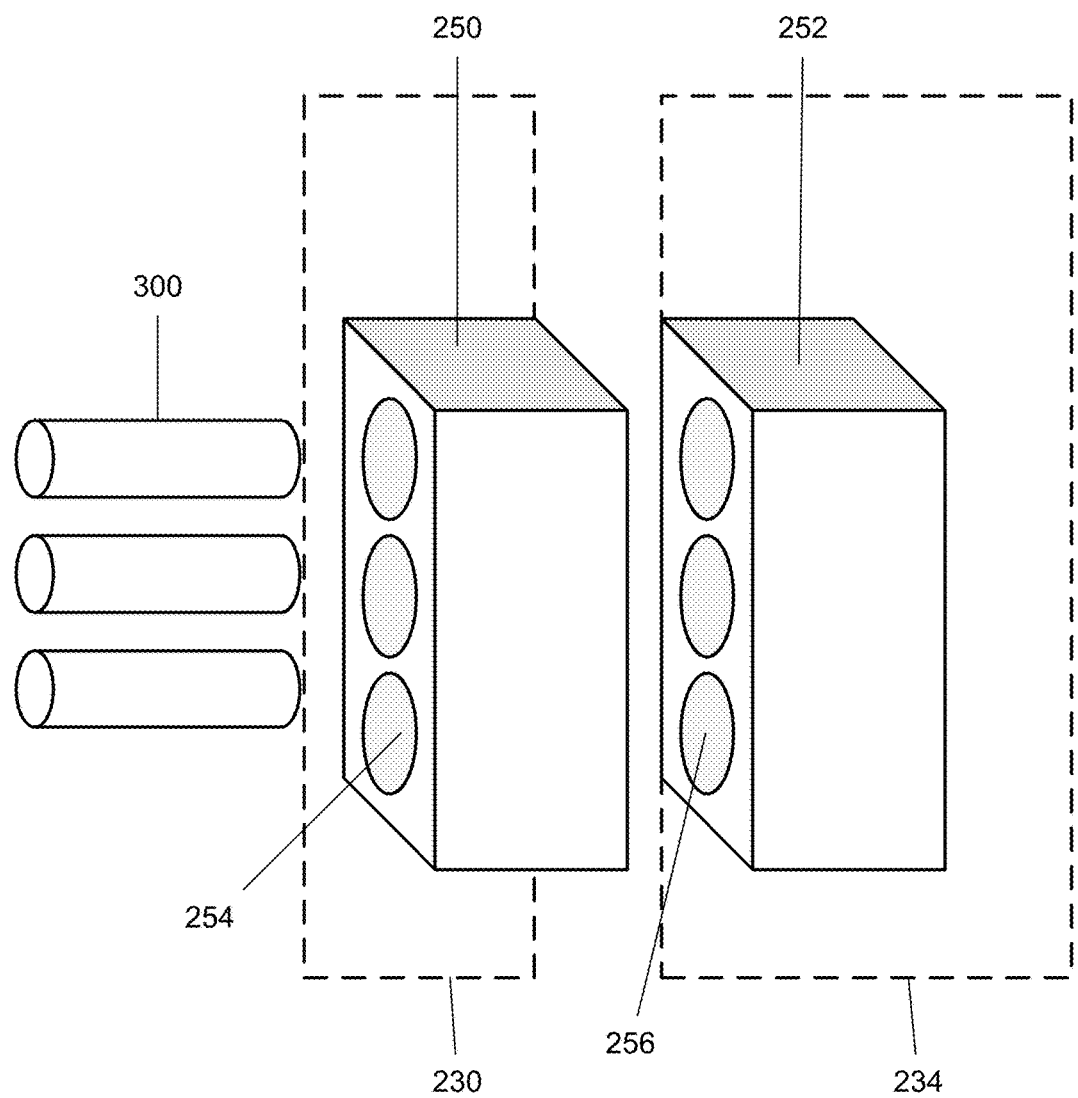
FIG. 8 is a perspective view of the obstruction device.

Referring to FIG. 7 and FIG. 8, the preferred embodiment the obstruction device is illustrated. The obstruction device may be any size and shape and made from any type of material. In the preferred embodiment the obstruction device is a metal component which is securely attached to the obstructed door 234 and the frame 230. The obstruction device may be attached by means of welding, nuts and bolts, or any other means which physically secures the obstruction device to the obstruction simulation device 100. The frame obstruction portion 250 is attached to the frame 230. The door obstruction portion 252 is attached to the obstructed door 234. As illustrated in FIG. 7 and FIG. 8, the frame obstruction portion 250 has one or more receiving channels 254. In addition, the door obstruction portion 252 has one or more receiving channels 256. There may be any number of receiving channels 254, 256. The receiving channels 254, 256 may be any size and shape. The receiving channels 254, 256 are configured to receive one or more obstruction bars 300. The obstruction bars 300 may be any size and shape. The obstruction bars 300 may be made from wood or from metal. The obstruction bars 300 are configured to be placed within the receiving channels 254, 256 of the obstruction device to prevent the obstructed door from being opened.

Figure 9:
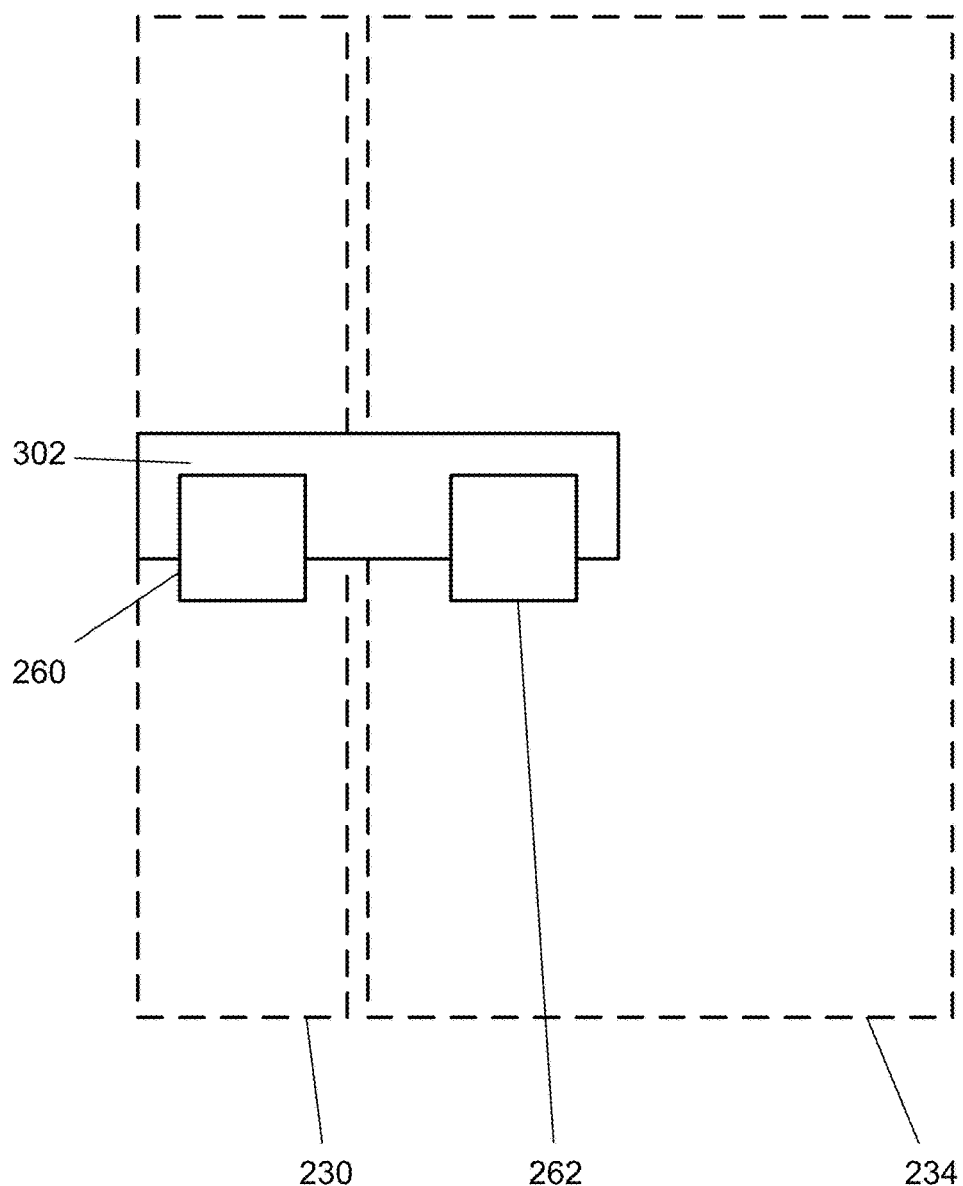
FIG. 9 is a plan view of an alternative embodiment of the obstruction device.

Referring to FIG. 9, an alternative embodiment of the obstruction device is illustrated. In this embodiment the obstruction device has a frame holding portion 260 and door holding portion 262. In this embodiment the frame holding portion 260 and door holding portion 262 are "L" shaped members attached to the obstruction simulation device 130 which permit a an obstruction plank 302 to be placed within the frame holding portion 260 and door holding portion 262. The obstruction plank 302 may be any size and shape and may be made from any material. In this embodiment the obstruction device is utilized similar to a barricade to prevent the obstructed door 234 from opening.

The obstruction simulation device 130 is utilized by a user placing one or more obstruction bars 300 within the receiving channels 254, 256 so that each obstruction bar 300 spans the frame obstruction portion 250 and a door obstruction portion 252. The obstruction bars 300 thus prevent the obstructed door 234 from opening. A user then utilizes a battering ram against the strike plate 240, preferably hitting the striking area 242. A user hits the strike plate 240 with the battering ram until the obstruction bars 300 are completely broken or bent to the degree that allows the obstructed door 234 to finally open.

Figure 10:
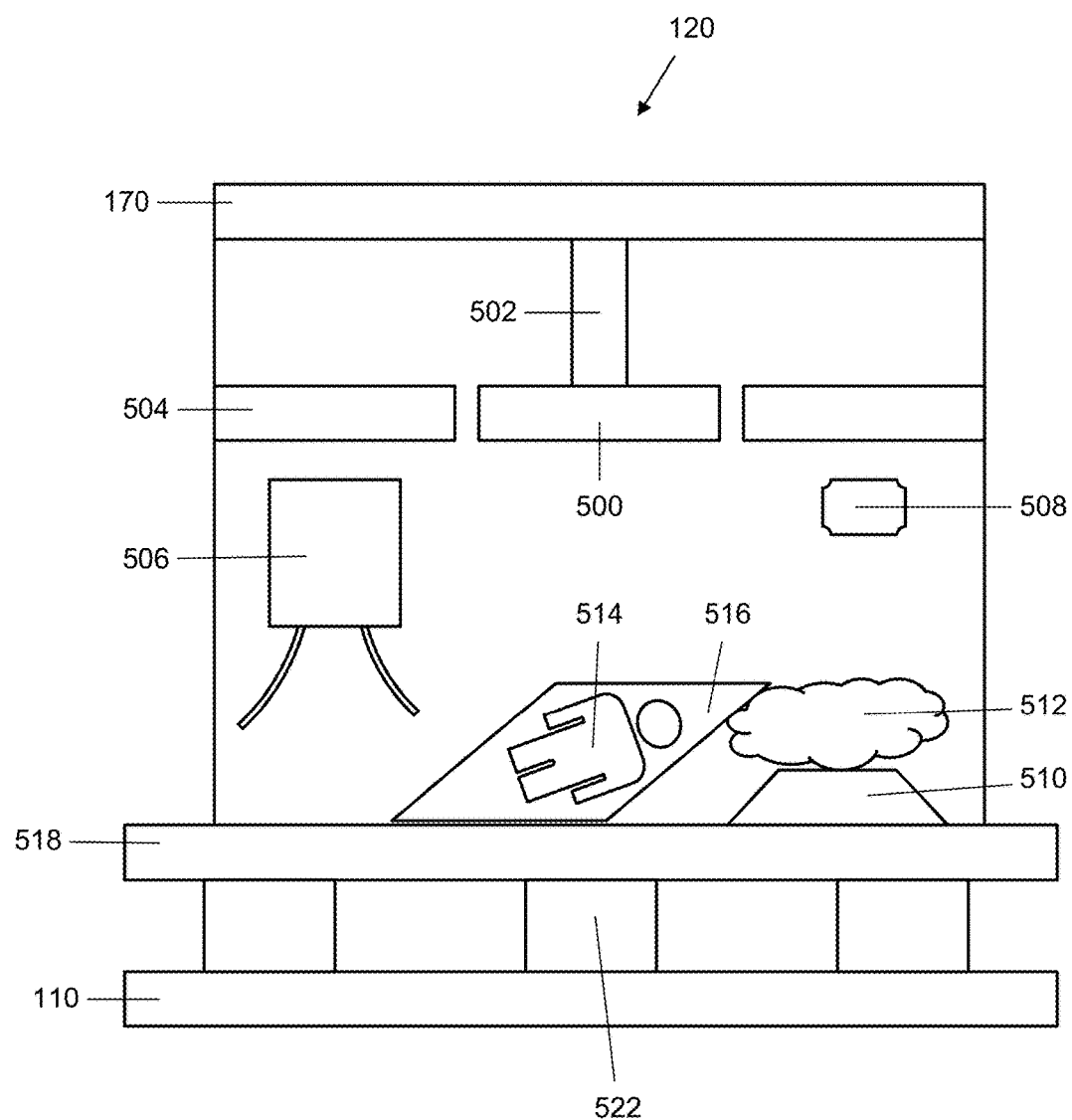
FIG. 10 is a plan view of the enclosure.

Referring to FIG. 10, the preferred embodiment of the inner space of the enclosure 120 is illustrated. The components illustrated in FIG. 10 may be utilized conjunctively or separately within the enclosure 120. The enclosure may utilize a collapsible roof simulation device 500. The collapsible roof simulation device 500 is a portion of ceiling which may be lowered or raised vertically. The collapsible roof simulation device 500 may be raised and lowered by a motorized spindle 502 attached to the roof 170. Other means may be utilized instead of a motorized spindle, such as a retractable arm, ropes and pulleys, and any other standard manual or automated means for raising and lowering the collapsible roof simulation device 500. In other embodiments the collapsible roof simulation device 500 may be a hinged member attached to an inner wall which folds out from the wall to simulate a collapse. In some embodiments the entire ceiling portion of the enclosure may be the collapsible roof simulation device 500. In the illustrated embodiment only a portion of the ceiling simulate collapse and there are fixed ceiling sections 504 which remain stationary and do not move vertically.

Within the enclosure 120 may also be a breaker box simulation device 506. The breaker box simulation device 506 is a simulation of a faulty electric breaker box. The breaker box simulation device 506 may have a manual switch. The breaker box simulation device 506 may have one or more loose wires protruding from the box. The breaker box simulation device 506 may have a number of lights or other effects to simulate electric sparks. A user may utilize the switch to simulate turning off a faulty breaker box and thereby stop all lights and effects of creating the simulated sparks.

Within the enclosure 120 may also be one or more lights 508. The lights 508 may be any color and may be flashing to simulate an emergency situation. The enclosure may also have a smoke machine 510 which creates a nontoxic smoke 512 to simulate smoke and haze created by an actual fire.

Within the enclosure 120 may also be a mannequin 514. The mannequin 514 may be utilized to simulate a person in need of rescue during an emergency situation. Additionally, the enclosure 120 may have a spinal board 516. The spinal board 516 allows users to place the mannequin 514 on the spinal board 516 to simulate the steps taken by paramedics in an emergency situation.

The enclosure may also have a movable floor 518 which may be moved by one or more pistons 522. The pistons 522 may be secured to the mobile platform 110. The pistons 522 may be utilized the move all or part of the movable floor 518. In this manner the movable floor 518 may be utilized to simulate an earthquake situation or unstable floor situation. In other embodiments of the invention there are no pistons 522 and no movable floor 518 but instead a stationary floor.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A mobile entertainment apparatus comprising
    a) a mobile platform comprising
        i) a hitch;
        ii) one or more axles;
        iii) one or more wheels disposed on said one or more axles;
        iv) one or more jacks disposed on a bottom side of said mobile platform;
        v) an open deck portion disposed on a rear portion of said mobile platform;
        vi) a right side rail;
        vii) a left side rail;
    b) an enclosure disposed on a top side of said mobile platform, said enclosure comprising
        i) a right side wall;
        ii) a left side wall;
        iii) a rear wall;
        iv) a front wall;
    c) an obstructed access simulation device disposed on a top side of said mobile platform, said obstructed access simulation device comprising
        i) a frame;
        ii) one or more hinges attached to said frame;
        iii) a door attached to said one or more hinges; and
        iv) an obstruction device.

2. The mobile entertainment apparatus as in claim 1 further comprising a non-toxic smoke generator disposed within said enclosure.

3. The mobile entertainment apparatus as in claim 1 further comprising
    a) one or more speakers disposed within said enclosure; and
    b) one or more lights disposed within said enclosure.

4. The mobile entertainment apparatus as in claim 1 wherein said enclosure further comprises one or more doors.

5. The mobile entertainment apparatus as in claim 1 further comprising a ramp disposed on a rear portion of said mobile platform.

6. The mobile entertainment apparatus as in claim 1 further comprising a vertically movable ceiling portion disposed in said enclosure.

7. The mobile entertainment apparatus as in claim 1 wherein said door of said obstruction device further comprises a strike plate disposed on a front side of said door.

8. The mobile entertainment apparatus as in claim 1 wherein said obstruction device comprises
   a) a door mounted portion;
   b) a frame mounted portion; and
   c) one or more elongated members removably secured to said door mounted portion and said frame mounted portion.

9. The mobile entertainment apparatus as in claim 8 further comprising a non-toxic smoke generator disposed within said enclosure.

10. The mobile entertainment apparatus as in claim 9 further comprising
    a) one or more speakers disposed within said enclosure; and
    b) one or more lights disposed within said enclosure.

11. The mobile entertainment apparatus as in claim 10 further comprising
    a) an open deck portion disposed on a rear portion of said mobile platform, wherein said mobile deck portion further comprises
       i) a right side rail; and
       ii) a left side rail.

12. The mobile entertainment apparatus as in claim 11 wherein said enclosure further comprises one or more doors.

13. The mobile entertainment apparatus as in claim 12 further comprising a ramp disposed on a rear portion of said mobile platform.

14. The mobile entertainment apparatus as in claim 13 further comprising a vertically movable ceiling portion disposed in said enclosure.

15. The mobile entertainment apparatus as in claim 14 wherein said door of said obstruction device further comprises a strike plate disposed on a front side of said door.

16. A method for providing entertainment comprising
    a) attaching a mobile entertainment apparatus to a towing vehicle, wherein said mobile entertainment apparatus comprises
       i) a mobile platform comprising
          (1) a hitch;
          (2) one or more axles;
          (3) one or more wheels disposed on said one or more axles;
          (4) one or more jacks disposed on a bottom side of said mobile platform;
          (5) an open deck portion disposed on a rear portion of said mobile platform;
          (6) a right side rail;
          (7) a left side rail;
       ii) an enclosure disposed on a top side of said mobile platform, said enclosure comprising
          (1) a right side wall;
          (2) a left side wall;
          (3) a rear wall;
          (4) a front wall;
       iii) an obstructed access simulation device disposed on a top side of said mobile platform, said obstructed access simulation device comprising
          (1) a frame;
          (2) one or more hinges attached to said frame;
          (3) a door attached to said one or more hinges; and
          (4) an obstruction device;
    b) towing said mobile entertainment apparatus to an entertainment location;
    c) disconnecting said mobile entertainment apparatus from said towing vehicle;
    d) stabilizing said mobile entertainment apparatus my by means of said one or more jacks;
    e) permitting one or more individuals access to said mobile entertainment apparatus;
    f) permitting a user to engage said obstructed access simulation device with a breaching device; and
    g) permitting a user to enter said enclosure.

17. The method as in claim 16 further comprising
    a) reattaching said mobile entertainment apparatus to said towing vehicle; and
    b) towing said mobile entertainment apparatus to a second location.

18. The method as in claim 16, wherein said mobile entertainment apparatus further comprises a ramp disposed on a rear portion of said mobile platform, said method further comprising
    a) extending said ramp from said mobile platform prior to permitting access to said mobile entertainment apparatus; and
    b) retracting said ramp after terminating access to said mobile entertainment apparatus.

19. The method as in claim 16, wherein said mobile entertainment apparatus further comprises a vertically movable ceiling portion disposed in said enclosure, said method further comprising
    a) lowering said vertically movable ceiling portion while a user is within said enclosure.

* * * * *